Oct. 23, 1928.
H. E. BLOMGREN
1,688,682
SPRING SHACKLE ANTIRATTLE ATTACHMENT
Filed July 21, 1927
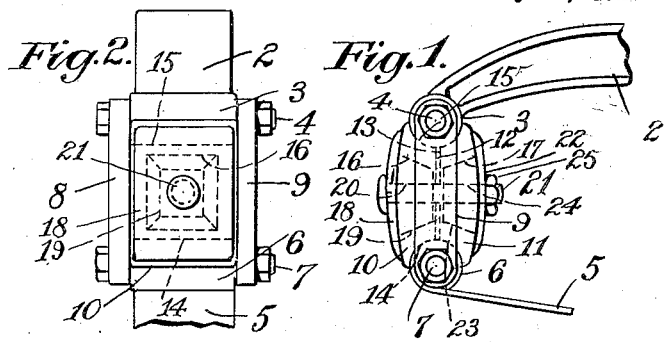
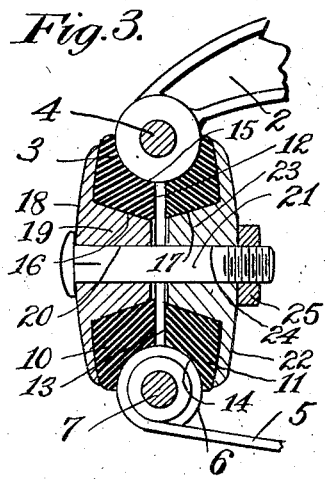
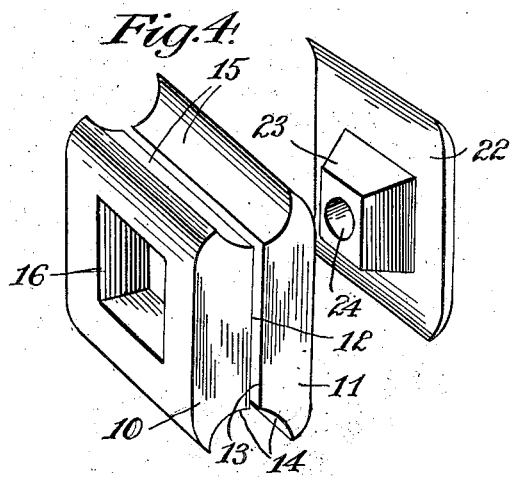
Inventor
H. E. Blomgren.
By his Attorney Wm. H. Reid.

Patented Oct. 23, 1928.

1,688,682

UNITED STATES PATENT OFFICE.

HENRY E. BLOMGREN, OF BROOKLYN, NEW YORK.

SPRING-SHACKLE ANTIRATTLE ATTACHMENT.

Application filed July 21, 1927. Serial No. 207,350.

This invention pertains to the spring connections of a motor vehicle where the parts have relative movements to permit the flexing of the spring.

The object of the present invention is to provide a form of resilient member that will be held under tension against several of the relatively movable parts at the spring connection, that will prevent rattle and noise should the parts wear and have lost motion, and it will prevent or reduce the wear of such parts.

In the accompanying drawing showing embodiments of my invention,

Figure 1 shows in side elevation a frame member having at two places the spring connection.

Fig. 2 is an end view of one part.

Fig. 3 is a vertical section enlarged.

Fig. 4 shows the resilient block portion, and one attaching plate.

As set forth, the frame member 2 has the usual eye 3 at one end, that carries a pivot bolt 4. The spring 5 is shown with the usual eye portion 6 at the end to receive the pivot bolt 7. These two eyes are of the same length, and the pivot bolts carry the links 8 and 9 in the usual manner, permitting the spring to swing on this double hinge connection.

To prevent rattle and lost motion at these hinge portions, a block of resilient non-metallic material such as rubber is provided, in two complemental portions, adapted to be clamped together in this rectangular opening between the opposed eyes and the opposed links. As set forth I provide a rubber block in two portions 10 and 11, see Fig. 4, that are substantially similar and are brought together on their inner faces 12 and 13, in which position they form a rounded groove 14 on the lower edge, and a rounded groove 15 at the upper edge, which grooves correspond in shape with the said eyes 3 and 6. It will be understood that these two complemental halves can be inserted from opposite sides of this opening to engage the two eyes, and the length of the blocks is the same, and they are designed to be brought to engage the opposite links 9 and 10.

Means are provided for drawing the two blocks toward each other, and they are shaped at these curved portions whereby they will not close together on the adjacent faces, when they engage these eye portions, but are slightly separated as indicated in Fig. 3. A clamping member is passed through the middle open portions of these blocks tending to draw them together, and which may also function to produce expansion of the blocks outwardly against the eyes, and also against the links. The block 10 is shown provided with a substantially square opening 16, which has the walls converging inwardly on the four sides as shown. The other block 11 has a similar square opening 17 with inwardly converging walls. These blocks and openings are adapted to receive clamping plates, such as a plate 18, having at the middle portion a wedge block 19 substantially square, but with converging walls corresponding to the contour of the opening 16 in the block 10. The plate and wedge block 19 have a bore 20 therethrough, to receive a clamping bolt 21.

The other block 11 is provided with a similar clamping plate 22, having an expanding wedge 23 to engage the converging opening 17 in this rubber block 12. This clamping member also has a bore 24 to receive the bolt 21. It will be understood from Fig. 3 that the bolt 21 is passed through the two clamps, and when its nut 25 is drawn up it will press the clamping members and wedges into the two rubber blocks 10 and 11, tending to move them together against the two eye members 3 and 6 at their upper and lower edges. But the wedge portions of the clamps will expand the rubber blocks and tend to move them outwardly in the four directions, at the same time the plate portions 16 and 22 will confine the rubber portions and permit distension outwardly only. This will obviously press the side edges of the rubber blocks outward against the links 8 and 9, so that these four members of the hinge connection are placed under considerable tension, that is constant because of the resiliency of the rubber blocks. The bolt can be tightened from time to time to maintain this tension on the blocks.

What I claim is:

1. The combination with a spring shackle formed of side links and upper and lower eye members connected by the links, of a pair of blocks of resilient material such as rubber placed in proximity at the middle of the shackle, and a clamp engaging the blocks to hold them together under compression whereby to expand the said marginal portions into engagement with all of the said members of the shackle.

2. The combination with a spring shackle formed of side links and upper and lower eye members connected by the links, of a pair of blocks, of resilient material such as rubber placed in proximity at the middle of the shackle, each block having the edges diverging outwardly whereby to compose a combined structure that has a groove at the margins to engage the said shackle members, and clamping means passing through the blocks to hold them together under compression whereby to expand the said marginal portions into engagement with the said members of the shackle.

3. The combination with a spring shackle formed of side links and upper and lower eye members connected by the links, of a pair of blocks of resilient material such as rubber placed in proximity at the middle of the shackle, said blocks each having an opening there-through that flares outwardly from the adjacent walls, and a pair of clamping members each having a tapered portion arranged to enter said tapered opening of the members, and provided with an extension plate to engage the blocks on their outer face.

4. The combination with a spring shackle formed of side links and upper and lower eye members connected by the side links, of a pair of blocks of resilient material such as rubber placed in proximity at the middle of the shackle, said blocks each having an opening there-through that flares outwardly from the adjacent walls, a pair of clamping members each having a tapered portion arranged to enter said tapered opening of the members, and provided with an extension plate to engage the blocks on their outer face, and a clamping member passing through the said tapered members to draw them together under compression and distend the elastic blocks outwardly against the said engaged members.

5. The combination with a spring shackle formed of side links and upper and lower eye members connected by the links, of a pair of blocks of resilient material such as rubber placed in proximity at the middle of the shackle, each block having the edges diverging outwardly from the inner face whereby to compose a combined structure that has a groove at the margins to engage the said shackle members, said blocks each having an opening there-through that flares outwardly from the adjacent walls, and a pair of clamping members each having a tapered portion arranged to enter said tapered opening of the members, and provided with an extension plate to engage the blocks on their outer face.

6. The combination with a spring shackle formed of side links and upper and lower eye members connected by the side links, of a pair of blocks of resilient material such as rubber placed in proximity at the middle of the shackle, each block having the edges diverging outwardly from the inner face whereby to compose a combined structure that has a groove at the margins to engage the said shackle members, said blocks each having an opening there-through that flares outwardly from the adjacent walls, a pair of clamping members each having a tapered portion arranged to enter said tapered opening of the members, and provided with an extension plate to engage the blocks on their outer face, and a clamping member passing through the said tapered members to draw them together under compression and distend the elastic blocks outwardly against the said engaged members.

Signed at New York, N. Y. on July 19, 1927.

HENRY E. BLOMGREN.